(12) United States Patent
Feldtkeller (10) Patent No.: US 12,244,240 B2
(45) Date of Patent: Mar. 4, 2025

(54) POWER CONVERTER CONTROLLER, POWER CONVERTER AND METHOD

(71) Applicant: Infineon Technologies Austria AG, Villach (AT)

(72) Inventor: Martin Feldtkeller, Munich (DE)

(73) Assignee: Infineon Technologies Austria AG, Villach (AT)

( * ) Notice: Subject to any disclaimer, the term of this patent is extended or adjusted under 35 U.S.C. 154(b) by 210 days.

(21) Appl. No.: 17/972,344

(22) Filed: Oct. 24, 2022

(65) Prior Publication Data

US 2023/0147858 A1  May 11, 2023

(30) Foreign Application Priority Data

Nov. 11, 2021  (EP) .................................... 21207729

(51) Int. Cl.
*H02M 7/00*  (2006.01)
*H02M 1/00*  (2006.01)
*H02M 7/04*  (2006.01)

(52) U.S. Cl.
CPC ........... *H02M 7/05* (2021.05); *H02M 1/0009* (2021.05); *H02M 1/0012* (2021.05); *H02M 1/0025* (2021.05); *H02M 1/0087* (2021.05)

(58) Field of Classification Search
CPC .... H02M 7/05; H02M 1/0009; H02M 1/0012; H02M 1/0025; H02M 1/0087
USPC ............................................................ 363/13
See application file for complete search history.

(56) References Cited

U.S. PATENT DOCUMENTS

| | | | |
|---|---|---|---|
| 9,325,235 B2* | 4/2016 | Pahlevaninezhad | ......................... H02M 1/4225 |
| 2014/0043875 A1* | 2/2014 | Hsing | ....................... G05F 1/56 363/77 |
| 2017/0196054 A1* | 7/2017 | Lena | ...................... H05B 45/48 |
| 2017/0237352 A1 | 8/2017 | Wang et al. | |

FOREIGN PATENT DOCUMENTS

| | | | | |
|---|---|---|---|---|
| EP | 2560063 A1 | 2/2013 | | |
| EP | 2645559 A2 | 10/2013 | | |
| GB | 2458699 A | * | 9/2009 | ............ H02M 7/217 |

OTHER PUBLICATIONS

European Search Report, EP 21 20 7729, Apr. 20, 2022, pp. 1-7.
Fairchild Semiconductor, FSAR001, AC-DC Linear Regulator, Jan. 2011, pp. 1-12.
MPS, The Future of Analog IC Technology, MP103 Easy Power, Higher Power, Offline Inductor-Less Regulator for Low Power Applications, Jan. 23, 2014, pp. 1-20.
Schneider, System on package AC/DC, May 2020, pp. 1-7.
Office Action, EP 21 207 729.1, Oct. 23, 2024, pp. 1-5.

* cited by examiner

*Primary Examiner* — Yemane Mehari
(74) *Attorney, Agent, or Firm* — Armis IP Law, LLC (57) ABSTRACT

A controller for a power converter, a corresponding power converter and a corresponding method are provided. The controller for a power converter includes a rectifier configured to receive an alternating current input signal and output rectified half waves, an output capacitor and a current control device is coupled between the rectifier and the output capacitor. After reaching a first maximum voltage, power flowing is gradually reduced, and later the current provided to the output capacitor is gradually ramped up.

14 Claims, 6 Drawing Sheets

POWER CONVERTER CONTROLLER, POWER CONVERTER AND METHOD

RELATED APPLICATION

This application claims priority to earlier filed European Patent Application Serial Number EP21207729 entitled "POWER CONVERTER CONTROLLER, POWER CONVERTER AND METHOD," filed on Nov. 11, 2021, the entire teachings of which are incorporated herein by this reference.

TECHNICAL FIELD

The present application relates to controllers for power converters, to power converters and to corresponding methods for operating such power converters.

BACKGROUND

Power converters are devices which convert an input electrical power (voltage and current) to an output electrical power (voltage and current), which may be required for a certain application. For example, to supply electrical appliances, power converters convert an AC (alternating current) input voltage like a mains voltage to a DC output voltage required for the corresponding appliance.

Depending on power consumption, various requirements regarding power factor correction (PFC), efficiency, galvanic isolation and the like may have to be met. The present application generally relates to power converters for low power, for example output power lower than 5 W, 2 W or lower than 1 W, where no galvanic isolation is required and efficiency is not the main issue. For those applications, typically costs and space requirement are major issues.

Various types of power converters are conventionally used for such applications. One type is referred to as non-isolated buck converter. In such a non-isolated buck converter, a control circuit is referenced to the source terminal of a buck switch used and has no direct access to the output terminals. Therefore, output voltage regulation may be quite inaccurate. This solution typically requires a high voltage input capacitor and a choke.

Another approach is sometimes referred to as "cap dropper" and uses a capacitor in series with input terminals receiving the input voltage. This capacitor takes most of the input voltage. A displacement current through the capacitor is rectified and used to generate an output voltage. The available current is limited and depends on the magnitude of the input voltage. A main disadvantage of this solution is that it requires a high voltage capacitor capable of operating under the input voltage, typically a comparatively high AC input voltage, over the lifetime of the power converter, including transients in the input voltage. This capacitor may be bulky and expensive.

A third solution is referred to as phase cut power supply. From a rectified sinusoidal input only portions are used where the input level voltage is below a threshold voltage. A low voltage output capacitor stores charge for times when the input voltage is higher and is not used.

Such phase cut power supplies require no inductive or high voltage component except the so-called phase cut switch, which separates the input voltage from the output capacitor when the input voltage is above the threshold, by switching off. Therefore, a required space is small and costs are comparatively low. The power efficiency is typically in the range of 10% to 40%, making it suitable for lower output powers, for example in a range from 300 mW to 500 mW.

However, phase cut power supplies may have issues like generation of higher harmonics due to the switching off of the phase cut switch, control loop stability, efficiency and transient overvoltage robustness.

SUMMARY

A controller for a power converter as defined in claim 1, a power converter including such a controller as defined in claim 12 and a method as defined in claim 15 are provided. The dependent claims define further embodiments.

A controller for a power converter including a rectifier configured to receive an alternating current input signal and output rectified half waves, an output capacitor and a current control device coupled between the rectifier and the output capacitor is provided, wherein the controller is configured to control the current control device such that:

(I) a first part of each rectified half wave starting from the beginning of each rectified half wave is provided to the output capacitor up to a first maximum current value with a minimum on-resistance of the current control device;

(II) after reaching the first maximum current value, a current provided to the output capacitor via the current control device is gradually reduced;

(III) after the gradually reducing, the current provided to the output capacitor via the current control device is gradually ramped up to a second maximum current value, and (IV) after a second maximum current value is reached, a last part of each rectified half wave ending with the end of each rectified half wave is provided to the output capacitor with the minimum on-resistance of the current control device.

According to a further embodiment, a corresponding power converter including the rectifier, the output capacitor, the current control device and the above-mentioned controller is provided.

According to a further embodiment, a method for controlling a current control device of a power converter including a rectifier configured to receive an AC input signal and output rectified half waves, an output capacitor and the current control device coupled between the rectifier and the output capacitor is provided, wherein the method comprises controlling the current control device such that:

(I) a first part of each rectified half wave starting from the beginning of each rectified half wave is provided to the output capacitor up to a first maximum current value with a minimum on-resistance of the current control device;

(II) after reaching the first maximum current value, a current provided to the output capacitor via the current control device is gradually reduced;

(III) after the gradually reducing, the current provided to the output capacitor via the current control device is gradually ramped up to a second maximum current value, and (IV) after a second maximum current value is reached, a last part of each rectified half wave ending with the end of each rectified half wave is provided to the output capacitor with the minimum on-resistance of the current control device.

The above summary is merely intended to give a brief overview of some embodiments is not to be construed as limiting in any way.

DETAILED DESCRIPTION

In the following, various embodiments will be described in detail referring to the attached drawings. These embodiments are given by way of example only and are not to be construed as limiting. For example, while embodiments may be described as comprising a plurality of features (components, elements, method steps, devices, acts, events, etc.), in other embodiments some of these features may be omitted or may be replaced by alternative features. In addition to the features explicitly shown and described, other features, for example features used in conventional power converters like conventional phase cut power converters, may be used.

Features from different embodiments may be combined to form further embodiments. Modifications and variations described with respect to one of the embodiments are also applicable to other embodiments. For example, FIGS. 6 to 8 describe different modifications of the embodiment of FIG. 5, and while these different modifications are described separately with respect to separate embodiments, two or more of these modifications may also be used in combination with each other.

Connections or couplings shown in the drawings or described herein refer to electrical connections or couplings unless noted otherwise. Such connections or couplings may be modified, for example by adding intervening elements or modifying elements, as long as the general purpose of the connection or coupling, for example to transmit a voltage or current or to transmit some information signal, is essentially maintained.

Figure 1:
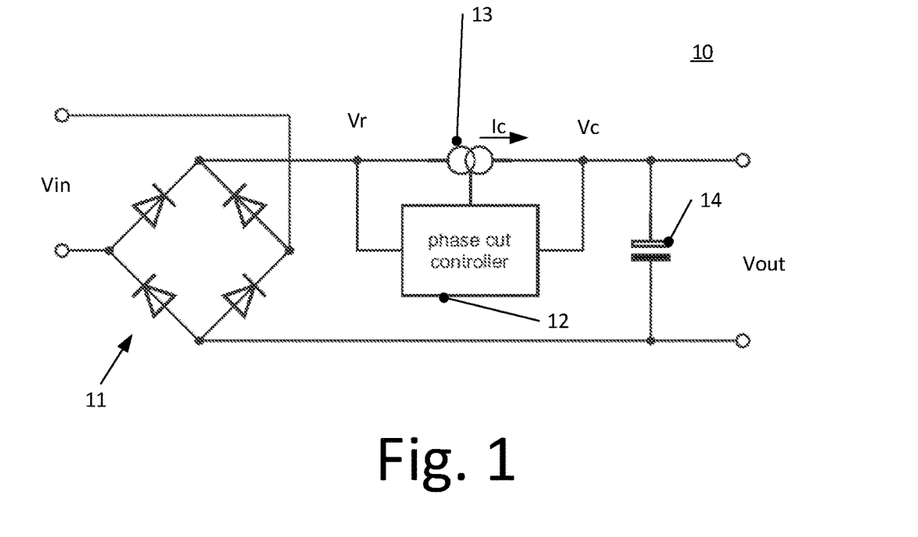
FIG. 1 is a diagram illustrating a power converter according to an embodiment.

Turning now to the figures, FIG. 1 illustrates a power converter 10 according to an embodiment. Power converter 10, as will be described below in more detail, is a modification of a conventional phase cut converter.

Unlike conventional phase cut converters, in embodiments discussed herein a current from a rectifier to an output capacitor is not cut off abruptly, for example upon reaching a threshold input voltage, and then switched on abruptly again later, but is reduced or ramped up gradually. Gradually means that the absolute slope of the current is lower than a slope that would be present if a switching element like a transistor were switched off or on abruptly. For example, slopes of current over time when gradually decreasing or ramping up a current may be such that the duration of the gradually decreasing or ramping up is between 1% and 10% of the duration of a half wave of a rectified input voltage.

Power converter 10 receives an input voltage Vin and outputs an output voltage Vout. The input voltage Vin is provided to a rectifier 11, that provides a rectified voltage Vr. While a bridge rectifier using four diodes is illustrated in FIG. 1 as an example for rectifier 11, in other implementations other kinds of rectifiers, for example half wave rectifiers, may be used, for example for very low power applications, e.g. below 100 mW output power. Input voltage Vin is an alternating current (AC) input voltage, for example a mains input voltage. Rectified voltage Vr then includes rectified half waves.

Power converter 10 of FIG. 1 furthermore includes a current control device 13 providing a current Ic to an output capacitor 14, at which the output voltage Vout can be tapped. The output voltage Vout corresponds to a voltage Vc at output capacitor 14. The current Ic generally depends on a resistance of current control device 13 and the voltage difference Vr–Vc according to Ohm's law. Current control device 13 may include a semiconductor device like a transistor. It should be noted that the resistance of current control device may have a nonlinear behavior. For example, when a MOSFET transistor is used for implementation of current control device 13, the resistance may increase with current also in a fully switched on state according to a triode characteristic. In addition to a semiconductor device, current control device may include a passive ohmic resistor in series to such a semiconductor device, for example to protect the semiconductor device against overvoltages.

Current control device 13 is controlled by a phase cut controller 12. In contrast to conventional solutions, where essentially a simple switch like a transistor switch which is only fully switched on or fully switched off is provided between a rectifier like rectifier 11 and an output capacitor like output capacitor 14, current control device 13 may be controlled to have a variable resistance, for example by operating a transistor above a threshold voltage, but below a voltage where the transistor is fully turned on (for example in a linear region) to provide gradually decreasing or rising currents, as will be explained further below.

As illustrated in FIG. 1, phase cut controller 12 may receive the rectified voltage Vr and the voltage at the output capacitor 14, Vc, and bases the control thereon. Examples for this control will now be explained further referring to FIGS. 2 to 4.

Figure 2:
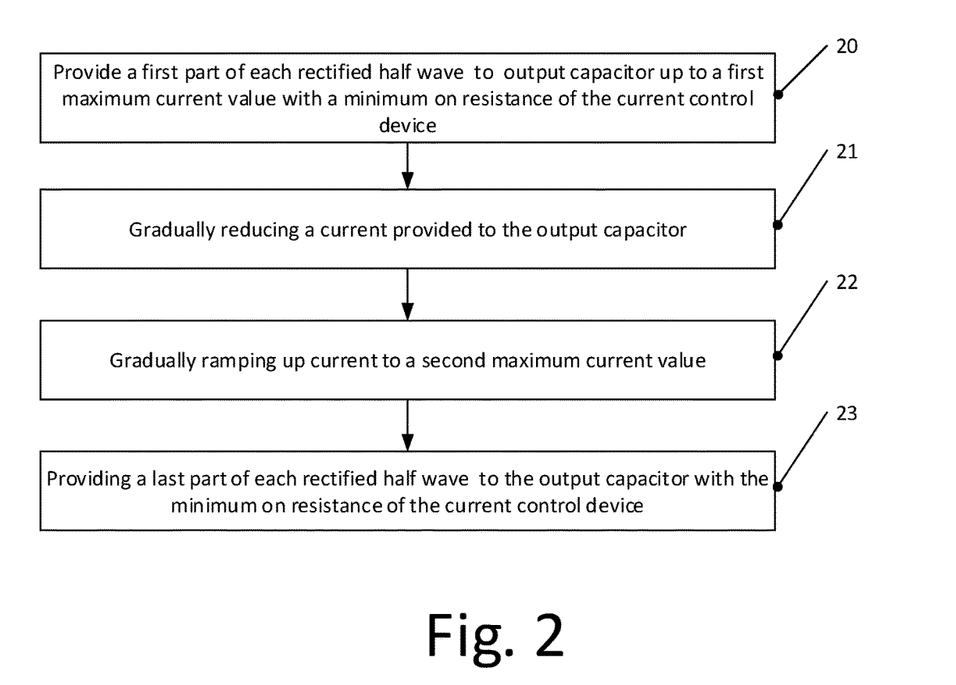
FIG. 2 is a flowchart illustrating a method according to an embodiment.

FIG. 2 illustrates a method according to an embodiment, which may for example be implemented by phase cut controller 12 of FIG. 1 controlling current control device 13 accordingly.

Figure 3:
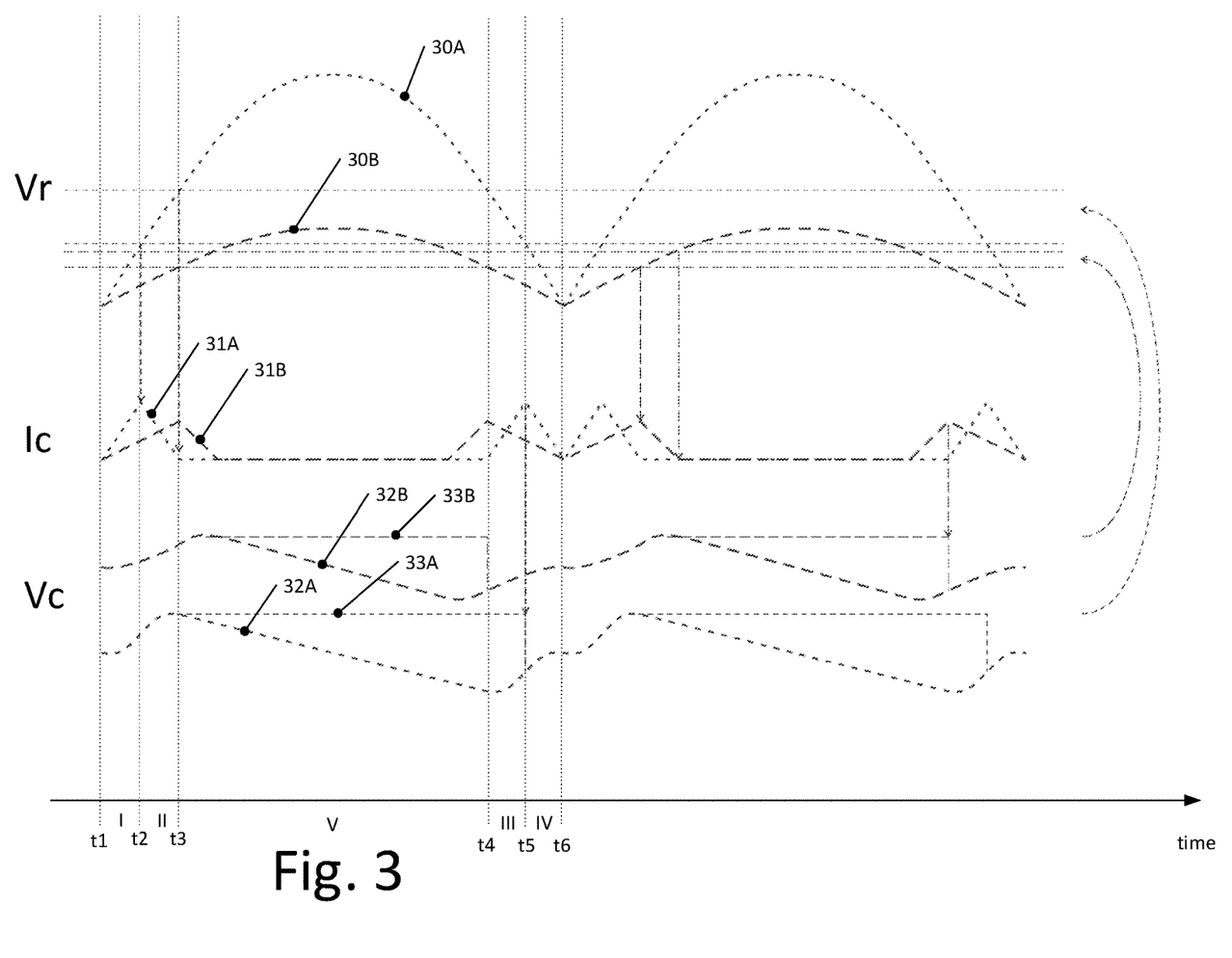
FIG. 3 is a diagram illustrating example voltages and currents for illustrating embodiments.
Figure 4:
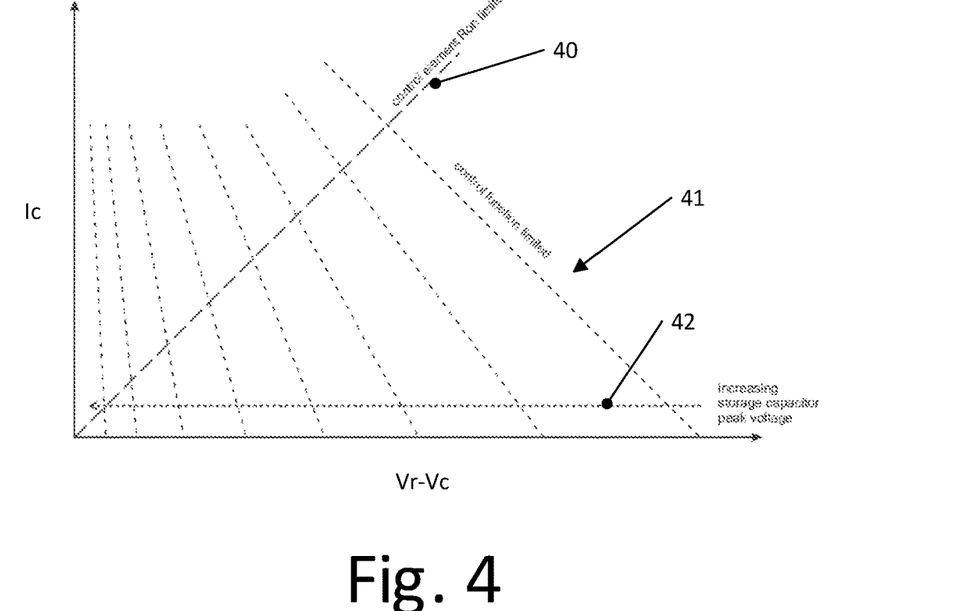
FIG. 4 is a diagram illustrating a control scheme according to some embodiments.

FIG. 3 shows example signals for illustrating the method of FIG. 3. FIG. 4 is a diagram for explaining the control further.

In FIG. 3, curves 30A and 30B illustrate two examples of the rectified input voltage Vr after rectifier 11 in the form of sinusoidal half waves. Curve 30A illustrates a higher input voltage, and curve 30B illustrates a lower input voltage.

Curves 31A and 31B illustrate corresponding examples of the current Ic provided via current control device 13, where curve 31A shows an example current of a rectified voltage Vr corresponding to curve 30A, and curve 31B shows a corresponding current Ic for curve 30B. Curves 32A and 32B show corresponding voltages Vc at output capacitor 14, where again curve 32A corresponds to curves 30A and 31A, and curve 32B corresponds to curves 30B and 31B.

It should be noted that the curves of FIG. 3 serve only as examples for illustration purposes, and depending on the implementation of phase cut controller 12, current control device 13 and on the magnitude of the input voltage Vin as well as depending on the implementation of rectifier 11 and output capacitor 14, curves may differ depending on implementation.

At 20, the method comprises providing a first part of each rectified half wave to the output capacitor up to a first maximum current value with a minimum on-resistance of the current control device. To illustrate, in FIG. 3, for curves 30A, 31A and 32A this corresponds to a phase I between times t1 and t2. Minimum on-resistance indicates that the current control device 13 is turned fully on. For example, a transistor is turned fully on, such that it has its (minimum) on-resistance Ron. Generally, each switch or similar device, even when switched on (i.e. conducting between its terminals), has some resistance left, which is referred to as the minimum on-resistance herein. This minimum on-resistance is not necessarily the theoretically obtainable minimum resistance, but the minimum resistance obtainable in practical use in a particular application. For example, the on-resistance of an n-channel depletion transistor, compared to an on-resistance at a gate source voltage Vgs=0, may be further reduced by applying a voltage Vgs>0. However, in many practical applications, Vgs=0 will be used, for example when no supply voltage above the source voltage is available. Therefore, the minimum on-resistance in this case corresponds to the on-resistance at Vgs=0. Further, the minimum on-resistance may also include an ohmic resistance of a resistor coupled in series to a semiconductor device, as mentioned above.

In this phase I, the current Ic therefore rises according to the rise in voltage difference Vr–Vc up to a first maximum current at time t2 for curve 31A. As in many cases a maximum of Vr is significantly larger than Vc, this may approximately correspond to a rise proportional to Vr. Similar considerations apply to curve 31B, where the current Ic also rises up to a first maximum current (different current than in case of curve 31A). It should be noted that phases I to V and times t1 to t6 are explicitly marked only for curves 30A, 31A, 32A and not curves 30B, 31B, 32B for clarity's sake.

Returning to FIG. 2, after reaching the first maximum current value, at 21 a current provided to the output capacitor is gradually reduced. This may be effected for example by gradually increasing a resistance of current control device 13. In some embodiments, this may be done until the current Ic reaches essentially zero or, in other words, the current control device 13 is completely switched off. An example for curve 31A is shown as a phase II between times t2 and t3, and is also shown in curve 31B, where after the maximum the current is gradually decreased to essentially zero, despite rising input voltage Vr. The control of the current control device 13 in this phase II may depend on the voltage Vc during phase II, and on the voltage Vr, both of which may be provided to phase cut controller 12 of FIG. 1 as already explained referring to FIG. 1.

After phase II of FIG. 3, in some embodiments after 21 a phase may follow where the current is essentially at zero. Essentially zero may mean smaller than currents through a resistive divider following rectifier 11, as will be explained with reference to FIGS. 5 to 8, and may mean for example smaller than 100 µA or smaller than 10 µA. In FIG. 3, for curves 30A, 31A and 32A this phase is shown between times t3 and t4. In some other embodiments, phase III described next may immediately follow phase II at least in some situations, for example during startup, for a few half waves, and the current Ic may not go all the way down to zero, depending on the slopes of the current in phases II and III.

At 22 in FIG. 2, the current is gradually ramped up to a second maximum current value. As mentioned, for curves 30A, 31A and 33A this corresponds to a phase III between times t4 and t5. In particular, a resistance of current control device 13 during this phase may be gradually reduced until the minimum on-resistance Ron is reached at the second maximum threshold current. The control during this phase may be based on one or more values of Vc during phase II, in particular a maximum value as indicated by lines 33A, 33B in FIG. 3, and on the voltage Vr. In some embodiments, the absolute value of the slope during phase II may be similar to the absolute value of the slope during phase III, for example within ±5%, ±10%, ±15% or ±20%.

Likewise, the first maximum current may be similar to the second maximum current, for example within ±5%, ±10%, ±15% or ±20%.

After reaching the second maximum current value, at 23 the method of FIG. 2 comprises providing a last part of each rectified half wave, i.e. a part until the end of the respective rectified half wave, to the output capacitor with the minimum on-resistance of the current control device. This corresponds, for curves 30A, 31A and 32A, to a phase IV in FIG. 3 between times t5 and t6, where the voltage Vr goes down to zero, and the current Ic essentially follows this Voltage and goes down to zero, linked by the minimum on-resistance Ron. After this, a next cycle starts, i.e. the method of FIG. 2 resumes at 20. However, FIG. 3 is a slight approximation as mentioned above. As the current Ic actually depends on Vr–Vc, There may be a slight "current gap" between the cycles, during a time when Vr drops below Vc. During this time, Ic is essentially at zero, a negative current Ic being prevented by rectifier 11.

The duration of phases II and III above may be between 1% and 10% of the duration of a half wave of Vr, but is not limited thereto.

Next, some details of the control of the current control device used in some embodiments will be discussed.

In some embodiments, the absolute value of the slope of the current Ic over time during phase II may be greater than the absolute value of the slope during phase I, and similarly the absolute value of the slope during phase III may be greater than the absolute value of the slope during phase IV. Furthermore, as mentioned the control during phase III may be based on a value of Vc during phase II. For example, a maximum value or also a plurality of values may be stored, and the stored value may be used to control the current control device during phase III, for example such that Vc follows a predefined control curve. In particular, the amount of current provided to the output capacitor inter alia during phase II determines the voltage at the output capacitor and its maximum, and therefore based on the maximum of Vc a similar, but mirrored current waveform may be provided during phase III. It should be noted that by storing a plurality of values of Vc, the "mirroring" may be more exact, but a stability of the corresponding control may be less. Therefore, in embodiments only the maximum value may be used, which still may give an approximately mirrored current waveform, but with higher loop stability in some embodiments.

The way the current is reduced in phase II may for example be based on parametric modification of a stored control curve, which is selected based on the behavior of Vc in phase II and the input voltage Vr. The transition from phase I to phase II occurs when the current through the current control device 13 having a minimum on-resistance exceeds the current given by a control curve, which is generated also during phase I. During phase I the current is dominated by the minimum on-resistance, during phase II by the control curve.

A scheme for corresponding control curves will now further be explained referring to FIG. 4.

In the diagram of FIG. 4, various control curves are illustrated as current Ic depending on rectified input voltage Vr−Vc, where the control curve may be selected based on capacitor voltage Vc.

A curve 40 in FIG. 4 illustrates the behavior at the minimum on-resistance Ron of the current control device 13, corresponding to phases I and IV of FIG. 3. Here, the current Ic is determined by voltage Vr−Vc and the on-resistance Ron.

A family of curves 41 gives the current Ic over voltage Vr when the current is gradually reduced or ramped up, i.e. in phases II and III. A curve from family of curves 41 is selected based on the storage capacitor peak voltage, as indicated by lines 33B, 33A in FIG. 3, where for increasing storage capacitor peak voltage steeper curves are selected, as indicated by an arrow 42 in FIG. 4. A control of the current control device is then performed accordingly, for example by controlling a transistor accordingly to have a corresponding resistance. The current Ic actually provided is then the smaller one of a current given by curve 40 and a current given by the selected curve of the family of curves 41. This means that for example the maximum current (first maximum current or second maximum current above) may correspond to the current Ic at the crossing point between curve 40 and the selected one of family of curves 41.

Family of curves 41 may have a common crossing point on the y-axis (current axis), although this need not be the case. Furthermore, while the family of curves 41 is shown as linear functions in FIG. 4 and also in phases II and III of FIG. 3, this is not to be construed as limiting, and other continuous curves, for example continuous piecewise linear curves or other nonlinear continuous curves, may also be used. By the control thus implemented, a jump-like dependency of the current Ic from the applied voltage Vr may be avoided, in contrast to conventional phase cut controllers.

In some embodiments, phase cut controller 12 may be implemented as a microcontroller or similar processor device programmed accordingly to perform the respective control. Other implementations may use dedicated hardware components, in particular mostly analog hardware components, to implement phase cut controller 12. In this way, the power supply shown may be used to supply devices like devices including microcontrollers with power, without requiring a microcontroller for control itself. Example implementations will now be described referring to FIGS. 5 to 8. Components and elements already discussed with respect to the previous figures will not be described again in detail.

Figure 5:
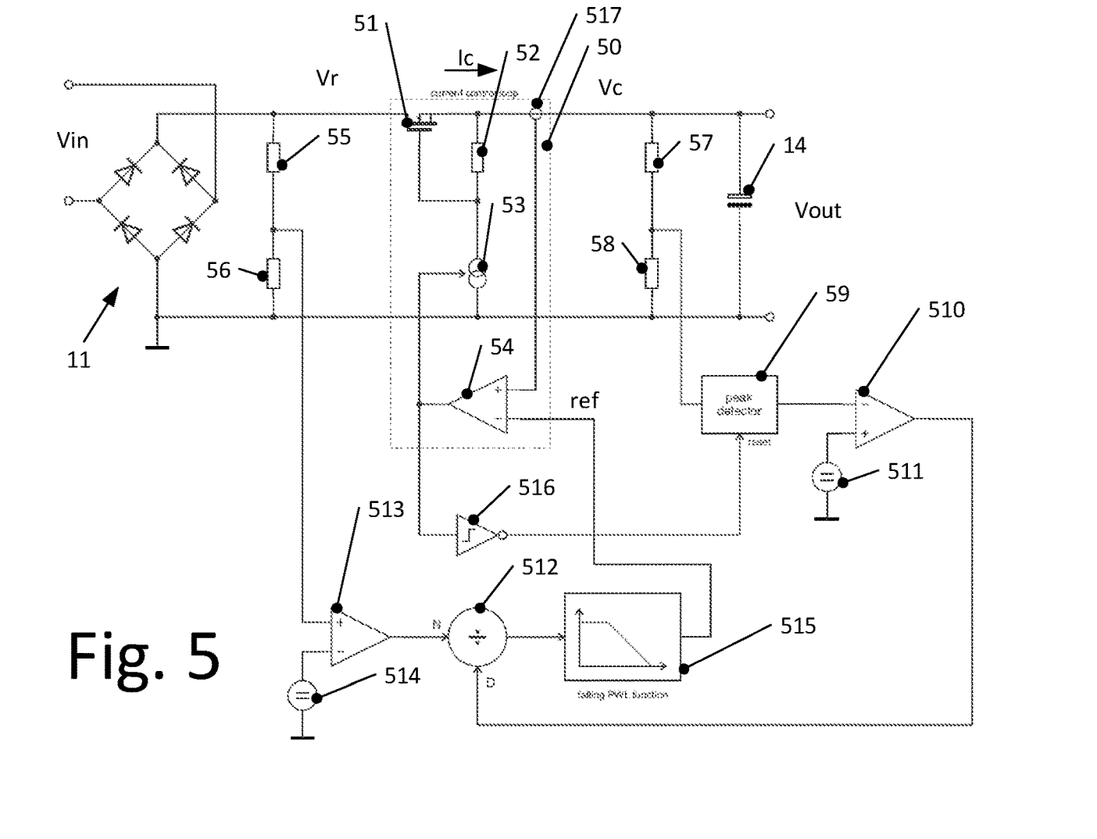
FIGS. 5 to 8 are circuit diagrams illustrating power converters according to various embodiments.

In FIG. 5, a current control device is implemented by a depletion transistor 51. Depletion transistor 51 is dimensioned depending on a maximum expected voltage difference Vr−Vc across its source and drain terminals. For example, the input voltage Vin may be a mains voltage of 240 VAC, 220 VAC or 110 VAC, and thus Vr may also have peaks in that order, and Vc may be of the order of a few Volt, such that depletion transistor 51 may be a high voltage transistor capable of handling voltages of 500 V and more. In some embodiments (not shown) in FIG. 5, a series resistor may be coupled to transistor 51 to limit the current Ic. Such a series resistor then contributes to the overall minimum on-resistance of the current control device.

The voltage Vr is provided to the control circuit shown using a first resistive voltage divider including resistors 55, 56. Resistors 55, 56 are designed such that following elements like a differential amplifier 513 may be designed for lower voltages than Vr. Likewise, voltage Vc is provided via a second resistive divider including resistors 57, 58. Resistors 55 to 58 are high-ohmic resistors to reduce losses due to current flow via the dividers. For example, the overall series resistance of resistors 55, 56 or of resistors 57, 58 may be in the Megaohm range.

Transistor 51 is generally controlled by a control loop 50. In the control loop, a differential amplifier 54 receives a measure of the current Ic measured by a current detector 517 at a positive input and a reference voltage ref on a negative input and controls a current source 53, which applies a gate voltage to transistor 51. "Measure of the current Ic" refers to a signal which is at least approximately proportional to current Ic. Current detector 517 may for example be implemented using a shunt resistor, a current mirror, a magnetoresistive detector like a hall sensor or any other conventional current detector. Furthermore, current source 53 is connected to a source terminal of transistor 51 via a resistor 52, such that using current source 53 a gate source voltage is applied to transistor 51, to switch transistor 51 fully on (minimum on-resistance), off (essentially electrical isolation between source and drain) or operate transistor 51 in a regime inbetween to regulate the resistance and therefore current Ic.

Reference voltage ref is determined based on voltage Vr received by the controller via voltage divider 55, 56 and voltage Vc received by the controller via voltage divider 57, 58.

The divided voltage Vr from resistive voltage divider 55, 56 is provided to a positive input of a differential amplifier 513, and a reference voltage represented by a voltage source 514 is provided to a negative input of differential amplifier 513. This reference voltage generates an offset to differential amplifier 513. In an embodiment, the offset corresponds to a nominal voltage of output capacitor 14, divided by the divider ratio of resistive divider 55, 56. Instead of the reference voltage, another resistive divider with the same ratio may be used. For example, resistive dividers 55, 56 and 57, 58 may be implemented in the same manner (using the same resistance values or ratios), and in this case the node between resistors 57, 58 may be directly coupled to the negative input of differential amplifier instead of voltage source 514. The output of differential amplifier 513 is a signal which is approximately proportional to the voltage across transistor 51, i.e. Vr−Vc. This output is fed as numerator (N) to a divider 512.

The output of resistive divider 57, 58 is provided to a peak detector 59, which detects a peak in the divided voltage Vc, corresponding to the detection of the peak in Vc indicated by lines 33A, 33B of FIG. 3. Peak detector 59 is reset by a level detector 516. Level detector 516 receives the output signal of differential amplifier 54 and is configured to output a reset signal if the output of differential amplifier 54 corresponds to a control setting transistor 51 to a minimum on-resistance (i.e. phases I and IV of FIG. 3). As long as the peak detector 59 is reset, the output of peak detector 59 follows its input. The output of peak detector 59 is provided to a negative (inverting) input of a differential amplifier 510. A reference voltage represented by a voltage source 511 is provided to the positive input of differential amplifier 510. The output of differential amplifier 510 represents a difference between the voltage Vc and a maximum allowed output capacitor voltage which should not be exceeded, which may for example be a maximum operating voltage of a circuit receiving the voltage Vout. This maximum allowed voltage is represented by the reference voltage provided by voltage source 511. The output of differential amplifier 510 is fed as denominator (D) to divider 512. The output of divider 512 is provided to a function generator 515 which generates the reference voltage to provide a control function as by curve family 41. As mentioned, this function may for example be a piecewise linear function.

For example, for implementing function generator 513, the output signal of divider 512 may be a current signal. From this signal, a constant current may be subtracted, for example by adding a constant current with opposite polarity provided by a current source. From the thus resulting combined current only positive values are further used. This only positive current is subtracted from a reference current to obtain the output signal ref of function generator 515 that decreases with increasing input signal and is limited to a maximum value corresponding to the reference current. In case ref is a current signal, also current detector 517 is configured to provide a current signal, and differential amplifier 54 is configured to compare two current signals.

Figure 6:
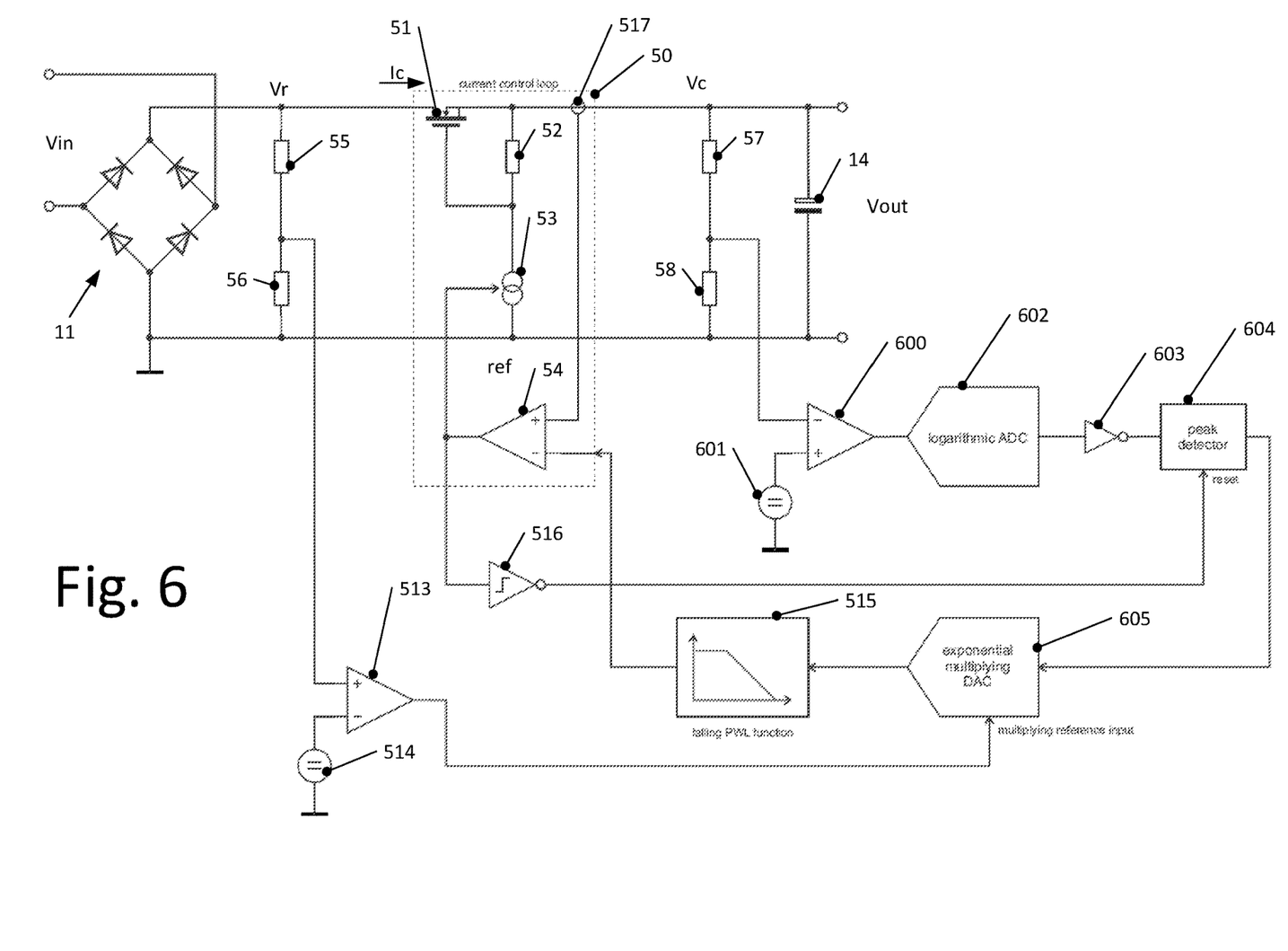
Figure 7:
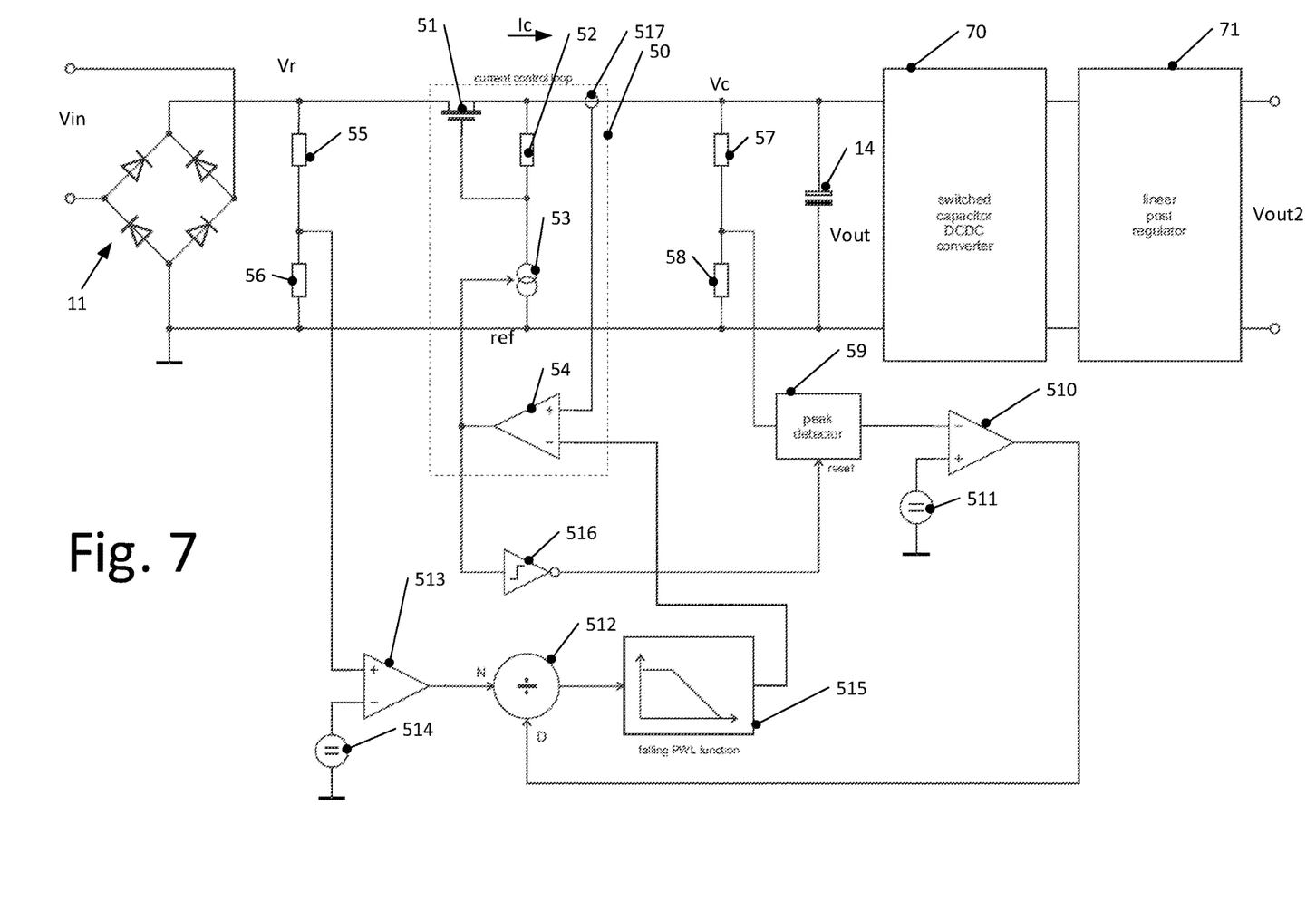
Figure 8:
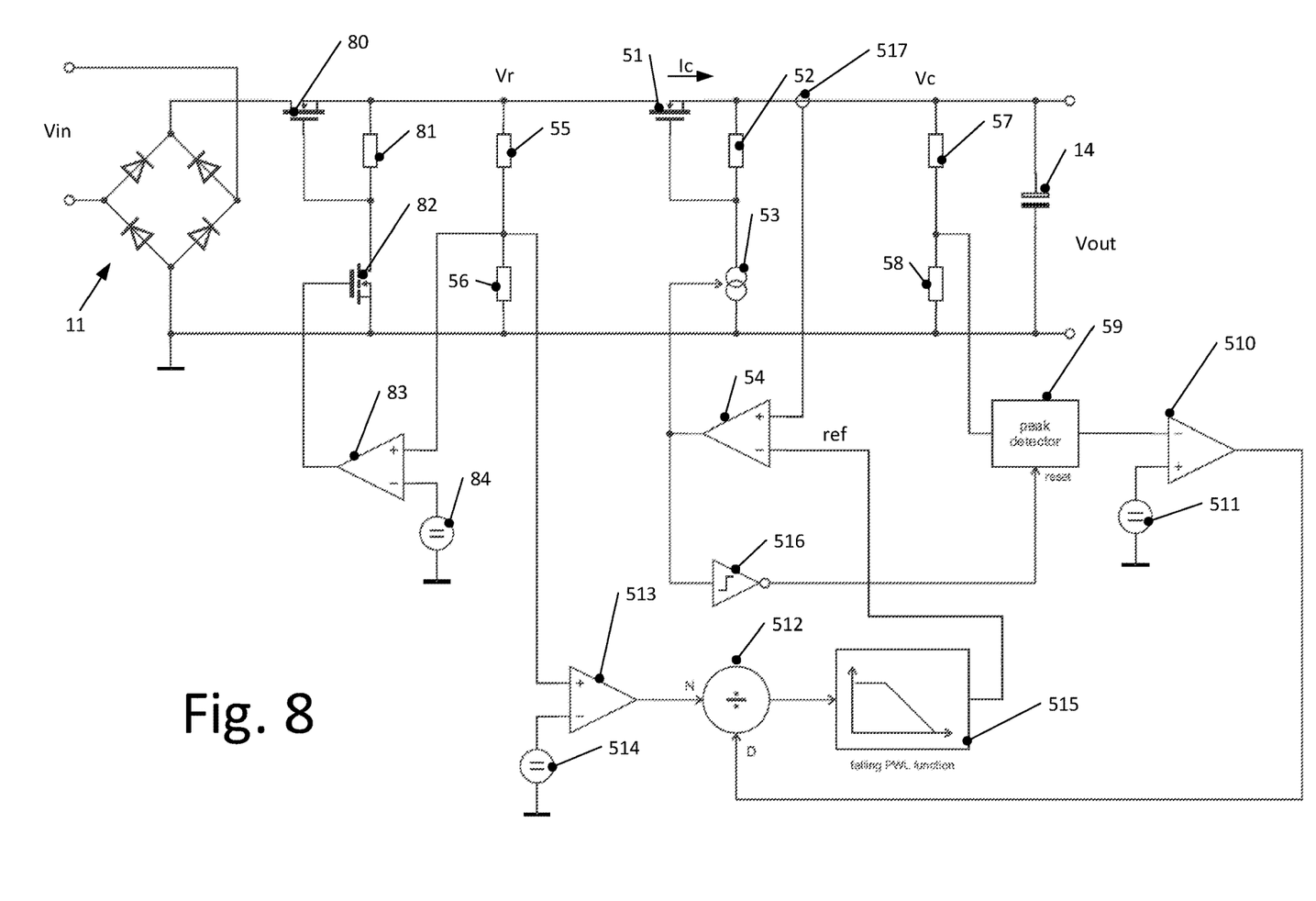

With respect to FIGS. 6 to 8, now variations to the embodiment of FIG. 5 will be described. Components corresponding to components of FIG. 5 bear the same reference numerals and will not be described again. Instead, only the differences of the respective embodiments of FIGS. 6 to 8 compared to the embodiment of FIG. 5 will be described. In FIG. 6, instead of providing an analog peak detector 59, a digital implementation is used. In FIG. 6, the voltage Vc divided by resistive divider 57, 58 is provided to a negative (inverting) input of a differential amplifier 600, and a reference voltage generated by a voltage source 601 is provided to a positive input of differential amplifier 600. The function of differential amplifier 600 and voltage source 601 corresponds to the function of differential amplifier 510 and voltage source 511 in FIG. 5, with the difference that in FIG. 5 differential amplifier 510 is provided downstream of peak detector 59, whereas in FIG. 6 the peak detection occurs downstream of differential amplifier 600.

An output of differential amplifier 600 is provided to a logarithmic analog-to-digital converter 602, which generates a digital code that represents the logarithm of the input voltage. For example, depending on implementation of logarithmic analog-to-digital converter 602 and the encoding used, an inverter for each bit line may need to be provided, represented by inverter 603. Downstream of inverter 603 a digital peak detector 604 is provided. Alternatively to inverter 603 and (maximum) peak detector 604, in other implementations a digital minimum detector may be provided, and inverter 603 may be omitted. Peak detector 604, apart from being realized in the digital domain, has the same functionality as peak detector 59 of FIG. 5 and is reset based on the output signal of level detector 516. In contrast to analog implementations, a digital implementation of peak detector 604 (or a minimum detector) has no constraints regarding a hold time.

The output of peak detector 604 is then converted to an analog signal by an exponential multiplying digital-to-analog converter (DAC) 605. This DAC 605 multiplies the signal output by differential amplifier 513, which represents the voltage drop across transistor 51, with a factor that exponentially depends on the digital value output by peak detector 604. This may provide a similar function as divider 512. The output of DAC 605 is provided to function generator 515 already discussed with reference to FIG. 5.

FIG. 7 illustrates a further variation of the embodiment of FIG. 5. Generally, the efficiency of the power converters discussed herein decreases for lower output voltages, as a smaller part of the half waves of the voltage Vr may be used.

In some cases, therefore, a two-stage conversion may be more efficient, where the power converter of FIG. 1, 5 or 6 generates a higher output voltage Vout than required by an application, and then an additional DC (direct current)/DC converter is used to downconvert this voltage. This is illustrated in FIG. 7, where the output voltage Vout is provided to a switched capacitor DC/DC converter. Switched capacitor DC/DC converter may be followed by a linear post regulator 71 to generate a required output voltage Vout2. As switched capacitor DC/DC converters and post regulators are conventional devices, they will not be described in further detail here.

To give a numerical example, when for example the components of the control loop are designed for voltages up to 30 V, an output voltage Vout close to 30 V may be generated. For example, the power converter may be designed to keep Vout in a range between 24 to 30 V including ripple. A 6:1 switched capacitor DC/DC converter may then be used to downconvert the voltage to a range between 4 V and 6 V, which could then be regulated to 3.3 V by linear post regulator 71. In this case, the average input current is only one sixth of a solution without the switched capacitor DC/DC converter 70 (i.e. directly providing Vout in the required range), which makes it easier to design the power converter for lower harmonic generation at better efficiencies.

FIG. 8 illustrates a further addition to the embodiment of FIG. 5. Generally, electronic power supplies as the power converters illustrated in FIGS. 5 to 8 may be required to survive line surges in the input voltage Vin. For example, if Vin is a mains voltage, such line surges may be induced by lightning strikes into the power grid. In most cases discrete protection circuits are needed which use bulky components. These components remain bulky even if the total power of a connected electronic supply is only a few Watts or even less. Most technologies suitable to build a power converter as illustrated in FIGS. 5 to 7 can handle voltages up to 600 V or 700 V. If such a supply could handle 1,200 V, protection against line surges would be easier.

The embodiment of FIG. 8 uses an additional depletion transistor 80 in series with transistor 51. To avoid having a voltage drop of 1,200 V on one chip, transistor 80 may be a discrete component separate from the remaining phase cut power supply, or may be provided on a separate chip die and integrated in a same package. During normal operation, transistor 80 is always on with its minimum on-resistance and therefore essentially does not influence operation of the power supply. In case of a surge in the input voltage, this is detected via resistive divider 55, 56, a differential amplifier 83, a transistor 82 controlled by differential amplifier 83 and a resistor 81 to keep depletion transistor 80 conducting when transistor 82 is off. To this end, differential amplifier 83 compares the divided voltage Vr to a reference voltage generated by a voltage source 84, and if the divided voltage Vr exceeds the reference voltage indicating a surge, a current flowing through transistor 82 causes a voltage drop across resistor 81 causing a negative gate source voltage at transistor 80, causing transistor 80 to be fully or partially switched off. Furthermore, at a high voltage (see FIG. 3) also transistor 51 is switched off. It should be noted that resistive divider 55, 56 in this case is used twice, once for controlling transistor 80 and once for the already described control loop controlling transistor 51. In other embodiments, separate dividers may be provided.

It should be noted that the arrangement of components 55, 56 and 80 to 84 is also capable of regulating the voltage Vr during an overvoltage input (surge of Vin) to a value that corresponds to the reference voltage generated by voltage source 84 multiplied by the inverse divider ratio of resistive divider 55, 56. This causes a distribution of the overvoltage between transistors 51 and 80, such that a probability of damage by the overvoltage is reduced.

Furthermore, as already mentioned the modifications shown in FIGS. 6 to 8 may be combined. For example, also in FIGS. 6 and 8 switched capacitor DC/DC converter 70 and linear post regulator 71 may be provided, and the surge protection illustrated with respect to FIG. 8 may also be provided to the power converters of FIGS. 6 and 7, etc.

Some embodiments are defined by the following examples:

Example 1. A controller for a power converter, the power converter including a rectifier configured to receive an alternating current input signal and output rectified half waves, an output capacitor, and a current control device coupled between the rectifier and the output capacitor, wherein the controller is configured to control the current control device such that:

(I) a first part of each rectified half wave starting from the beginning of each rectified half wave is provided to the output capacitor up to a first maximum current value with a minimum on resistance of the current control device;

(II) after reaching the first maximum current value, a current provided to the output capacitor via the current control device is gradually reduced, (III) after the gradually reducing, the current provided to the output capacitor via the current control device is gradually ramped up to a second maximum current value, and (IV) after a second maximum current value is reached, a last part of each rectified half wave ending with the end of each rectified half wave is provided to the output capacitor with the minimum on resistance of the current control device.

Example 2. The controller of example 1, wherein the controller, in (II), is configured to control the current control device based on the output voltage of the rectifier and the capacitor voltage at the output capacitor during (II).

Example 3. The controller of example 1 or 2, wherein the controller, in (III), is configured to control the current control device based on the output voltage of the rectifier and at least one value of the capacitor voltage of the output capacitor during (II).

Example 4. The controller of example 3, wherein the at least one value comprises a maximum value.

Example 5. The controller of any one of examples 1 to 4, wherein the first maximum current value is equal to the second maximum current value to within +/−20%.

Example 6. The controller of any one of examples 1 to 5, wherein the controller is configured to control the current control device to maintain the current at a minimum value between the gradually reducing and the gradually ramping up.

Example 7. The controller of example 6, wherein the minimum value is essentially zero.

Example 8. The controller of any one of examples 1 to 7, wherein an absolute value of a slope of the current when ramping up the current is equal to an absolute value of a slope when gradually decreasing the current to within +/−20%.

Example 9. The controller of any one of examples 1 to 8, wherein the controller is configured to increase an absolute value of a slope of the current when ramping up the current and a slope when gradually decreasing the current with increasing peak voltage across the output capacitor.

Example 10. The controller of any one of example 1 to 9, wherein the controller comprises:

a current source coupled to the control terminal of the current control device, a differential amplifier, wherein a first input of the differential amplifier is configured to receive a signal corresponding to the current flowing from the current control device to the output capacitor, an output of the differential amplifier is configured to control the current source, and a second input of the differential amplifier is configured to receive a reference value from a reference value generating circuit.

Example 11. The controller of example 10, wherein the reference value generating circuit comprises:

a voltage divider coupled to the output capacitor to output a divided voltage, a further differential amplifier configured to receive the divided voltage and a further reference voltage, a logarithmic analog to digital converter coupled to the output of the further differential amplifier to provide a stream of digital values, a peak detector configured to detect a peak value in the stream of digital values, and circuitry configured to generate the reference value based on the peak value.

Example 12. The controller of example 11, wherein the circuitry configured to generate the reference value comprises:

an exponential multiplying digital to analog converter configured to receive the peak value and a multiplication reference based on an output voltage of the rectifier, and a function generator configured to generate the reference value based on a falling transfer function and based on the output of the digital to analog converter.

Example 13. The controller of example 10, wherein the reference value generating circuit comprises:

a voltage divider coupled to the output capacitor to output a divided voltage, a peak detector configured to detect a peak value in the divided voltage, a further differential amplifier configured to receive the peak value and a further reference voltage, circuitry configured to generate the reference value based on an output of the further differential amplifier.

Example 14. The controller of example 13, wherein the circuitry configured to generate the reference value comprises:

a divider configured to receive the output of the further differential amplifier as denominator and numerator based on an output voltage of the rectifier, and a function generator configured to generate the reference value based on a falling transfer function and based on the output of the divider.

Example 15. The controller of any one of examples 1 to 14, wherein the current over time in (I) to (IV) is a continuous function.

Example 16. A power converter, comprising:
the controller of any one of examples 1 to 15,
the rectifier configured to receive an alternating current input signal and output rectified half waves,
the output capacitor, and
the current control device coupled between the rectifier and the output capacitor.

Example 17. The power converter of example 16, wherein the current control device comprises a transistor, wherein a first terminal of the transistor is coupled to the rectifier, a second terminal of the transistor is coupled to the output capacitor and a control terminal of the transistor is coupled to the controller.

Example 18. The power converter of example 16 or 17, comprising a further transistor coupled in series to the transistor to provide protection against line transients.

Example 19. The power converter of any one of examples 16 to 18, further comprising a direct current/direct current power converter coupled to the output capacitor to generate a further output voltage based on the output voltage.

Example 20. A method for controlling a current control device of a power converter including a rectifier configured to receive an alternating current input signal and output rectified half waves, an output capacitor and the current control device coupled between the rectifier and the output capacitor,
- wherein the method comprises controlling the current control device such that:
- (I) a first part of each rectified half wave starting from the beginning of each rectified half wave is provided to the output capacitor up to a first maximum current value with a minimum on-resistance of the current control device;
- (II) after reaching the first maximum current value, a current provided to the output capacitor via the current control device is gradually reduced;
- (III) after the gradually reducing, the current provided to the output capacitor via the current control device is gradually ramped up to a second maximum current value, and
- (IV) after a second maximum current value is reached, a last part of each rectified half wave ending with the end of each rectified half wave is provided to the output capacitor with the minimum on-resistance of the current control device.

Example 21. The method of example 20, comprising, in (II), controlling the current control device based on the output voltage of the rectifier and the capacitor voltage at the output capacitor during (II).

Example 22. The method of example 20 or 21, wherein the method, in (III), comprises controlling the current control device based on the output voltage of the rectifier and at least one value of the capacitor voltage of the output capacitor during (II).

Example 23. The method of example 22, wherein the at least one value comprises a maximum value.

Example 24. The method of any one of examples 20 to 23, wherein the first maximum current value is equal to the second maximum current value to within +/−20%.

Example 25. The method of any one of examples 20 to 24, further comprising controlling the current control device to maintain the current at a minimum value between the gradually reducing and the gradually ramping up.

Example 26. The method of example 25, wherein the minimum value is essentially zero.

Example 27. The method of any one of examples 20 to 26, wherein an absolute value of a slope of the current when ramping up the current is equal to an absolute value of a slope when gradually decreasing the current to within +/−20%.

Example 28. The method of any one of examples 20 to 27, wherein the method comprises increasing an absolute value of a slope of the current when ramping up the current and a slope when gradually decreasing the current with increasing peak voltage across the output capacitor.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

The invention claimed is:

1. A controller for a power converter, the power converter including: i) a rectifier configured to receive an alternating current input signal and output rectified half waves, ii) an output capacitor, and iii) a current control device coupled between the rectifier and the output capacitor,
- wherein the controller is configured to control the current control device such that:
- for a first condition (I), a first part of a respective rectified half wave of the rectified half waves starting from a beginning of the respective rectified half wave is provided to the output capacitor up to a first maximum current value via a minimum on resistance setting of the current control device;
- for a second condition (II) after reaching the first maximum current value, a current provided to the output capacitor from the respective rectified half wave through the current control device is gradually reduced;
- for a third condition (III) after the gradually reducing, the current provided to the output capacitor from the respective rectified half wave via the current control device is gradually ramped up to a second maximum current value; and
- for a fourth condition (IV) after the second maximum current value is reached, a last part of the respective rectified half wave ending with the end of the respective rectified half wave is provided to the output capacitor via the minimum on resistance setting of the current control device; and
- wherein the controller, in the third condition (III), is operative to control the current control device based on an output voltage of the rectifier and at least one voltage value of the output capacitor during the second condition (II).

2. The controller of claim 1, wherein the controller, in the second condition (II), is configured to control the current control device based on an output voltage of the rectifier and a voltage of the output capacitor.

3. The controller of claim 1, wherein the at least one voltage value comprises a maximum value.

4. The controller of claim 1, wherein the first maximum current value is equal to the second maximum current value to within +/−20%.

5. The controller of claim 1 wherein the controller is operative to control the current control device to maintain the current at a minimum value between the gradually reducing and the gradually ramping up.

6. The controller of claim 4, wherein the minimum value is zero.

7. The controller of claim 1, wherein an absolute value of a slope of the current when ramping up the current is equal to an absolute value of a slope when gradually decreasing the current to within +/−20%.

8. The controller of claim 1, wherein the controller is operative to increase an absolute value of a slope of the current when ramping up the current and a slope when gradually decreasing the current with increasing peak voltage across the output capacitor.

9. The controller of claim 1, wherein the controller comprises:
- a current source coupled to a control terminal of the current control device,
- a first differential amplifier, wherein a first input of the first differential amplifier is operative to receive a signal corresponding to the current flowing from the current control device to the output capacitor, an output of the first differential amplifier is operative to control the current source, and a second input of the first differential amplifier is operative to receive a reference value from a reference value generating circuit.

10. The controller of claim 9, wherein the reference value generating circuit comprises:
- a voltage divider coupled to the output capacitor to output a divided voltage;
- a second differential amplifier operative to receive the divided voltage and a further reference voltage;
- a logarithmic analog to digital converter coupled to the output of the second differential amplifier to provide a stream of digital values;
- a peak detector operative to detect a peak value in the stream of digital values; and
- circuitry operative to generate the reference value based on the peak value.

11. A power converter, comprising:
- the controller of claim 1,
- the rectifier operative to receive an alternating current input signal and output rectified half waves,
- the output capacitor, and
- the current control device coupled between the rectifier and the output capacitor.

12. A method for controlling a current control device of a power converter including a rectifier, the rectifier operative to receive an alternating current input signal and output rectified half waves, the power converter further including an output capacitor, the current control device coupled between the rectifier and the output capacitor,
wherein the method comprises controlling the current control device such that:
- for a first condition (I) a first part of each rectified half wave starting from the beginning of each rectified half wave is provided to the output capacitor up to a first maximum current value with a minimum on-resistance of the current control device;
- for a second condition (II) after reaching the first maximum current value, a current provided to the output capacitor via the current control device is gradually reduced;
- for a third condition (III) after the gradually reducing, the current provided to the output capacitor via the current control device is gradually ramped up to a second maximum current value, and
- for a fourth condition (IV) after a second maximum current value is reached, a last part of each rectified half wave ending with the end of each rectified half wave is provided to the output capacitor with the minimum on-resistance of the current control device.

13. The power converter of claim 11, wherein the current control device comprises a transistor, wherein a first terminal of the transistor is coupled to the rectifier, a second terminal of the transistor is coupled to the output capacitor and a control terminal of the transistor is coupled to the controller.

14. The power converter of claim 11 further comprising:
- a direct current/direct current power converter coupled to the output capacitor to generate a further output voltage based on the output voltage.

* * * * *